US011947299B2

(12) United States Patent
Ishida

(10) Patent No.: US 11,947,299 B2
(45) Date of Patent: Apr. 2, 2024

(54) SHEET STORAGE APPARATUS AND IMAGE FORMING APPARATUS

(71) Applicant: CANON KABUSHIKI KAISHA, Tokyo (JP)

(72) Inventor: Toshiki Ishida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/465,946

(22) Filed: Sep. 3, 2021

(65) Prior Publication Data

US 2022/0082976 A1 Mar. 17, 2022

(30) Foreign Application Priority Data

Sep. 11, 2020 (JP) ................................ 2020-152982

(51) Int. Cl.
*G03G 15/00* (2006.01)

(52) U.S. Cl.
CPC .................. *G03G 15/6502* (2013.01); *G03G 2215/00383* (2013.01)

(58) Field of Classification Search
CPC .......... G03G 15/6502; G03G 15/6505; G03G 15/6514; G03G 2215/00379; G03G 2215/00383; G03G 2215/00392; B65H 1/266; B65H 2405/11161; B65H 2405/112; B65H 2405/122; B65H 2405/113; B65H 2405/1132; B65H 2405/1134; B65H 2405/114
See application file for complete search history.

(56) References Cited

U.S. PATENT DOCUMENTS

| | | | | |
|---|---|---|---|---|
| 5,839,047 A * | 11/1998 | Hirabayashi | ........... | B65H 1/266 399/389 |
| 7,533,880 B2 * | 5/2009 | Kawanishi | ............. | B65H 1/266 271/171 |
| 9,725,263 B2 * | 8/2017 | Takai | ................. | G03G 15/6502 |
| 9,969,577 B2 * | 5/2018 | Eguchi | .................. | B65H 1/266 |

FOREIGN PATENT DOCUMENTS

| | | |
|---|---|---|
| JP | H01-285533 A | 11/1989 |
| KR | 950004589 Y1 * | 6/1995 |

OTHER PUBLICATIONS

Saori Narita et al., U.S. Appl. No. 17/463,732, filed Sep. 1, 2021.

* cited by examiner

*Primary Examiner* — Justin N Olamit
(74) *Attorney, Agent, or Firm* — VENABLE LLP

(57) ABSTRACT

A sheet cassette includes a first trailing edge regulator integrally formed with a cassette frame to regulate a position of a trailing edge of a first sized sheet in a feeding direction, and a second trailing edge regulator integrally formed with the cassette frame to regulate a position of a trailing edge of a sheet of a second size stored in the cassette frame in the feeding direction. A pair of side edge regulation members regulate positions of side edges of the sheet of the first size stored in the cassette frame in the width direction at a first position and regulate positions of side edges of the sheet of the second size stored in the cassette frame in the width direction at a second position.

16 Claims, 12 Drawing Sheets

SHEET STORAGE APPARATUS AND IMAGE FORMING APPARATUS

BACKGROUND OF THE INVENTION

Field of the Invention

This invention relates to a sheet storage apparatus used for an image forming apparatus, such as a copier, a printer, a facsimile, and a compound machine having a plurality of these functions, and the image forming apparatus including this sheet storage apparatus.

Description of the Related Art

Hitherto, a feed cassette is used as a sheet storage apparatus to store a sheet to be fed to an image forming unit. As such a feed cassette, the feed cassette including a side regulation member (side edge regulation member) regulating positions of the sheet stored inside the feed cassette in a width direction and a trailing edge regulation member regulating an upstream edge of the sheet in a sheet conveyance direction is widely used. Further, in such a feed cassette, a universal type feed cassette capable of storing the sheet of different sizes in one cassette in which the side and trailing edge regulation members are configured movably is known (refer to Japanese Patent Laid-Open No. H01-285533).

In this universal type feed cassette, since the side and trailing edge regulation members are disposed movably to any positions along guide portions formed on a cassette frame, the sheet of the different sizes are accepted. So as to regulate the sheet from both sides in the width direction, the side regulation member includes a pair of regulation plates, disposed opposite each other, which are connected by a rack gear and a pinion gear and relatively move in conjunction with each other.

Further, this universal type feed cassette includes a regulation member which is fixed to the cassette frame and regulates the position of the trailing edge of the sheet of a particular size. That is, the feed cassette includes a first regulation member regulating the trailing edge of the sheet at a time of storing the sheet of a first size, and a second regulation member regulating the trailing edge of the sheet at a time of storing the sheet of a second size. The first regulation member is fixed to the feed cassette, and, with respect to the sheet of the first size, regulates the positions of the side edges in the width direction and the position of the trailing edge in the sheet conveyance direction. The second regulation member is fixed to the feed cassette, and, with respect to the sheet of the second size, regulates the positions of the side edges in the width direction and the position of the trailing edge in the sheet conveyance direction.

Incidentally, considering actual usage of the universal type feed cassette, while it is easy to change the size of the sheet stored in the feed cassette, in some cases, the feed cassette is exclusively used for a storage of the sheet of a particular size. For example, it is known that usage ratios of the sheet of A4 and A3 sizes in the Japanese market and the sheet of letter and legal sizes in the North American market are overwhelmingly large.

However, a configuration of Japanese Patent Laid-Open No. H01-285533 described above includes the side and trailing edge regulation members movable to the cassette frame. Therefore, since a number of components and a cost are increased so as to dispose a function of movability, which is low in usage, to the side and trailing edge regulation members, reductions in the number of components and the cost are desired.

SUMMARY OF THE INVENTION

According to a first aspect of the present invention, a sheet storage apparatus storing a sheet to be fed in a sheet feeding direction includes a sheet storage portion configured to selectively store the sheet of a first size and the sheet of a second size, a length of the sheet of the first size in the sheet feeding direction being a first value, a length of the sheet of the first size in a width direction orthogonally intersecting with the sheet feeding direction being a second value, a length of the sheet of the second size in the sheet feeding direction being a third value that is shorter than the first value, a length of the sheet of the second size in the width direction being a fourth value that is longer than the second value, a first trailing edge regulation surface disposed in the sheet storage portion and configured to regulate a position of a trailing edge of the sheet of the first size stored in the sheet storage portion in the sheet feeding direction, a second trailing edge regulation surface disposed, in the sheet storage portion, downstream of the first trailing edge regulation surface in the sheet feeding direction and outside the sheet of the first size stored in the sheet storage portion in the width direction, and configured to regulate a position of a trailing edge of the sheet of the second size stored in the sheet storage portion in the sheet feeding direction, and a pair of side edge regulation members opposite each other and disposed, in the sheet storage portion, downstream of the second trailing edge regulation surface in the sheet feeding direction, the pair of side edge regulation members being configured to be selectively detachably attached to a first position and a second position, the pair of side edge regulation members regulating positions of side edges of the sheet of the first size stored in the sheet storage portion in the width direction at the first position, the pair of side edge regulation members regulating positions of side edges of the sheet of the second size stored in the sheet storage portion in the width direction at the second position.

According to a second aspect of the present invention, a sheet storage apparatus storing a sheet to be fed in a sheet feeding direction includes a sheet storage portion configured to selectively store the sheet of a first size and the sheet of a second size, a length of the sheet of the first size in the sheet feeding direction being a first value, a length of the sheet of the first size in a width direction orthogonally intersecting with the sheet feeding direction being a second value, a length of the sheet of the second size in the sheet feeding direction being a third value that is shorter than the first value, a length of the sheet of the second size in the width direction being a fourth value that is longer than the second value, a first trailing edge regulation surface disposed in the sheet storage portion and configured to regulate a position of a trailing edge of the sheet of the first size stored in the sheet storage portion in the sheet feeding direction, a second trailing edge regulation surface disposed, in the sheet storage portion, downstream of the first trailing edge regulation surface in the sheet feeding direction and outside the sheet of the first size stored in the sheet storage portion in the width direction, and configured to regulate a position of a trailing edge of the sheet of the second size stored in the sheet storage portion in the sheet feeding direction, a pair of side edge regulation units opposite each other and disposed, in the sheet storage portion, by being fixed at a position downstream of the second trailing edge regulation surface in the sheet feeding direction, the pair of side edge regulation units being configured to regulate positions of side edges of the sheet of the second size stored in the sheet storage portion in the width direction, and a pair of side edge regulation members opposite each other and detachably disposed with respect to the sheet storage portion, the pair of side edge regulation members, in a case being attached, being configured to regulate positions of side edges of the sheet of the first size stored in the sheet storage portion in the width direction.

According to a third aspect of the present invention, an image forming apparatus includes a sheet storage portion configured to selectively store a sheet of a first size and the sheet of a second size, a length of the sheet of the first size in a sheet feeding direction being a first value, a length of the sheet of the first size in a width direction orthogonally intersecting with the sheet feeding direction being a second value, a length of the sheet of the second size in the sheet feeding direction being a third value that is shorter than the first value, a length of the sheet of the second size in the width direction being a fourth value that is longer than the second value, a first trailing edge regulation surface disposed in the sheet storage portion and configured to regulate a position of a trailing edge of the sheet of the first size stored in the sheet storage portion in the sheet feeding direction, a second trailing edge regulation surface disposed, in the sheet storage portion, downstream of the first trailing edge regulation surface in the sheet feeding direction and outside the sheet of the first size stored in the sheet storage portion in the width direction, and configured to regulate a position of a trailing edge of the sheet of the second size stored in the sheet storage portion in the sheet feeding direction, a pair of side edge regulation members opposite each other and disposed, in the sheet storage portion, downstream of the second trailing edge regulation surface in the sheet feeding direction, the pair of side edge regulation members being configured to be selectively detachably attached to a first position and a second position, the pair of side edge regulation members regulating positions of side edges of the sheet of the first size stored in the sheet storage portion in the width direction at the first position, the pair of side edge regulation members regulating positions of side edges of the sheet of the second size stored in the sheet storage portion in the width direction at the second position, a sheet conveyance unit configured to feed the sheet stored in the sheet storage portion, and an image forming unit configured to form an image on the sheet fed by the sheet conveyance unit from the sheet storage portion.

Further features of the present invention will become apparent from the following description of exemplary embodiments with reference to the attached drawings.

DESCRIPTION OF THE EMBODIMENTS

Hereinafter, with reference to drawings, embodiments of this disclosure will be described. To be noted, in the following descriptions, positional relations in vertical and horizontal directions, a front side D1 (refer to FIG. 2), and a back side D2 (refer to FIG. 2) are indicated with respect to a state (viewpoint of FIG. 1) in which an image forming apparatus is viewed from the front side.

First Embodiment

Image Forming Apparatus

Figure 1:
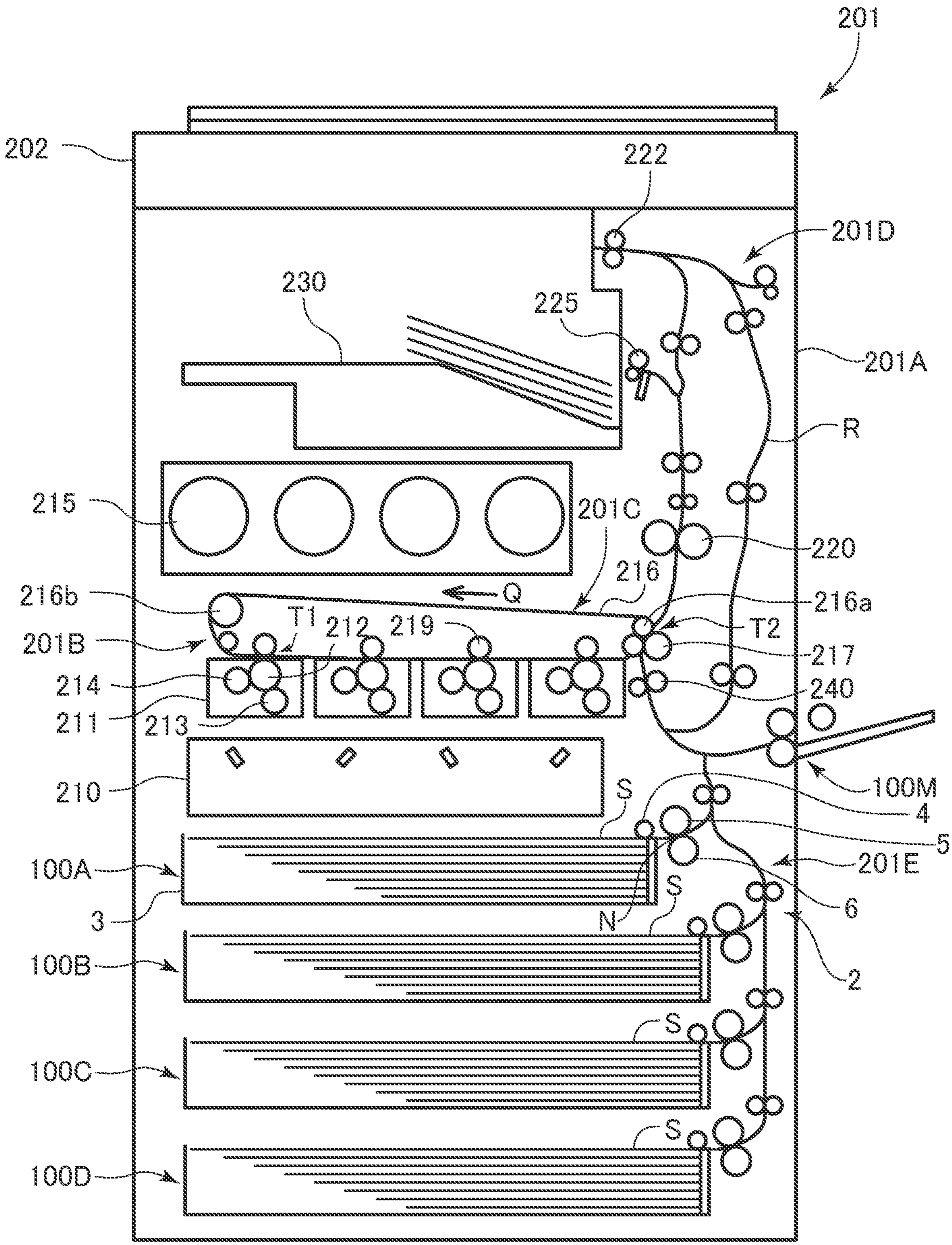
FIG. 1 is a cross-sectional view showing a schematic configuration of an image forming apparatus relating to a first embodiment.

A printer (image forming apparatus) 201 relating to a first embodiment is a full color laser beam printer of an electro-photographic system. As shown in FIG. 1, the printer 201 includes a printer body 201A that is an apparatus body, and a reading unit 202 disposed in an upper direction of the printer body 201A and reading image data of a document.

The printer body 201A includes an image forming unit 201B forming an image on a sheet S, a fixing unit 220 fixing the image on the sheet S, and the like. A discharge space to which the sheet S is discharged is formed between the reading unit 202 and the printer body 201A, a sheet discharge tray 230 on which a discharged sheet is stacked is disposed in this discharge space. Further, in the printer body 201A, a sheet feeding unit 201E feeding the sheet S to image forming unit 201B is disposed. The sheet feeding unit 201E includes cassette feeding units 100A, 100B, 100C, and 100D disposed in a lower part of the printer body 201A, and a manual feeding unit 100M disposed on a right side of the printer body 201A.

The image forming unit 201B is an image forming unit of a so-called four drum full color system including a laser scanner 210, four process cartridges 211, and an intermediate transfer unit 210C. These process cartridges each form a toner image of each color of yellow (Y), magenta (M), cyan (C), and black (K). Each of the process cartridges 211 includes a photosensitive drum 212, a charge unit 213, a developing unit 214, a cleaner, not shown, and the like. In the upper direction of the image forming unit 201B, a toner cartridge 215 storing each color of toners is freely detachably attached to the printer body 201A.

The intermediate transfer unit 210C includes an intermediate transfer belt 216 wound over a drive roller 216*a*, a tension roller 216*b*, and the like, and the intermediate transfer belt 216 is disposed in the upper direction of four process cartridges 211. The intermediate transfer belt 216 is disposed so as to come into contact with each of the photosensitive drums 212 of the process cartridges 211, and is rotatably driven by the drive roller 216*a* driven by a driving unit, not shown, in a counter-clockwise direction (in an arrow Q direction). The intermediate transfer unit 210C includes a primary transfer roller 219 coming into contact with an inner circumferential surface of the intermediate transfer belt 216 at a position opposite each of the photosensitive drums 212, and a nip portion between the intermediate transfer belt 216 and the photosensitive drum 212 forms a primary transfer portion T1. Further, the image forming unit 201B includes a secondary transfer roller 217 coming into contact with an outer circumferential surface of the intermediate transfer belt 216 at a position opposite the drive roller 216*a*. A secondary transfer portion T2 transferring the toner image borne on the intermediate transfer belt 216 to the sheet S is formed as a nip portion between this secondary transfer roller 217 and the intermediate transfer belt 216.

In each of the process cartridges 211 configured as described above, after an electrostatic latent image has been formed on each of the photosensitive drums 212 by the laser scanner 210, each color of the toner image charged in a negative polarity is formed by supplying the toner from the developing unit 214. These toner images are multiply transferred (primarily transferred) to the intermediate transfer belt 216 at each of the primary transfer portions T1 in sequence by applying a transfer bias voltage of a positive polarity to the primary transfer roller 219, and a full color toner image is formed on the intermediate transfer belt 216.

In parallel with these toner image forming processes, the sheet S fed from the sheet feeding unit 201E is conveyed towards a registration roller pair 240, and a skew is corrected by this registration roller pair 240. The registration roller pair 240 conveys the sheet S to the secondary transfer portion T2 in a timing synchronizing with a transfer timing of the full color toner image formed on the intermediate transfer belt 216. The toner image borne on the intermediate transfer belt 216 is secondarily transferred to the sheet S at the secondary transfer portion T2 by applying the transfer voltage of the positive polarity to the secondary transfer roller 217.

The sheet S on which the toner image has been transferred is heated and pressed at the fixing unit 220, and the color image is fixed on the sheet S. The sheet S whose image has been fixed is discharged to the sheet discharge tray 230 by a sheet discharge roller pair 225, and stacked on the sheet discharge tray 230. To be noted, in a case forming the image on both surfaces of the sheet S, having passed through the fixing unit 220, the sheet S is switchbacked by a reverse conveyance roller pair 222 capable of rotating normally and reversely disposed in an inverse conveyance portion 201D. Then, the sheet S is again conveyed to the image forming unit 201B via an inverse conveyance path R, and the image is formed on a back surface.

Cassette Feeding Unit

Hereinafter, the cassette feeding units 100A, 100B, 100C, and 100D will be described. Since these four tiers of the cassette feeding units 100A, 100B, 100C, and 100D are configured similarly, only the cassette feeding unit 100A in an uppermost tier will be described, and descriptions of the other cassette feeding units 100B, 100C, and 100D will be omitted herein.

The cassette feeding unit 100A includes a sheet feed unit 2 disposed in the printer body 201A and a feed cassette 3, that is an example of a sheet storage apparatus, capable of drawing out from and attaching to the printer body 201A. The sheet feed unit 2, that is an example of a sheet feed unit, includes a pickup roller 4 coming into contact with the sheet stacked in the feed cassette 3 and capable of feeding the sheet by conveying, and a feed roller 5 conveying the sheet fed by the pickup roller 4. Further, the sheet feed unit 2 also includes a retard roller 6 which forms a separation nip N with the feed roller 5 and separates the sheet into one sheet at a time. Herewith, the sheet feed unit 2 feeds the sheet S stored in the feed cassette 3. The image forming unit 201B forms the image on the sheet S fed from the feed cassette 3 by the sheet feed unit 2.

Feed Cassette

Figure 2:
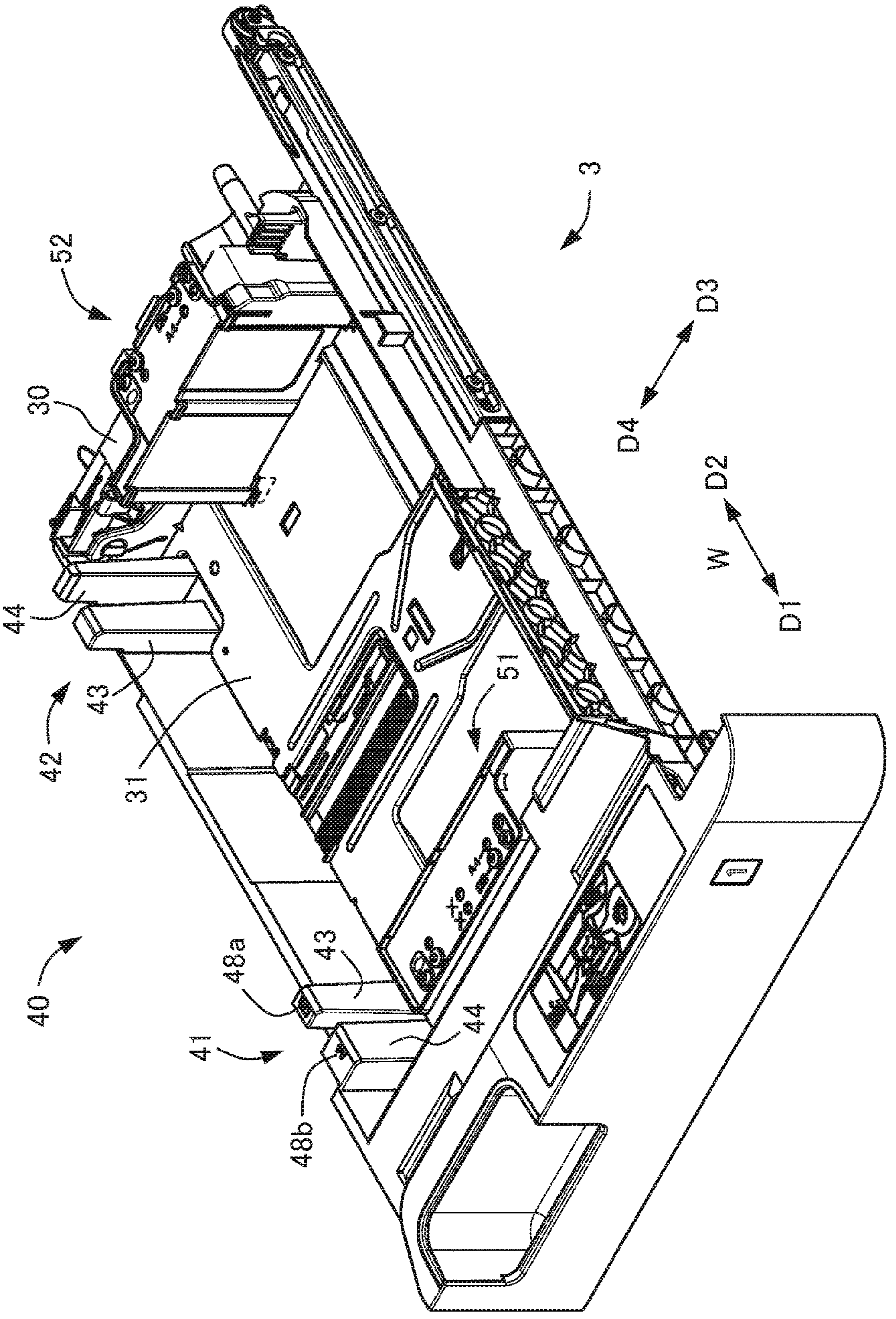
FIG. 2 is a perspective view showing a feed cassette relating to the first embodiment.

FIG. 2 is a diagram illustrating a configuration of the feed cassette 3 relating to the first embodiment. The feed cassette 3 is capable of drawing out to the front side D1 along a cassette rail, not shown, disposed in the printer body 201A (refer to FIG. 1) and capable of inserting into the back side D2 so that the feed cassette 3 is detachably supported with respect to the printer body 201A. The feed cassette 3 stores the sheet S to be fed in a sheet feeding direction D3 (refer to FIG. 1).

The feed cassette 3 includes a cassette frame 30, a stacking tray 31 stacking the sheet, serving as a sheet stacking unit disposed in the cassette frame 30, a trailing edge regulation unit 40, and a side edge regulation member 50. The cassette frame 30, that is an example of a sheet storage portion capable of storing the sheet S, and formed approximately in a shape of a casing. A lifting arm, not shown, is disposed in a lower direction of the stacking tray 31 inside the cassette frame 30, and pushes up the stacking tray 31 by receiving driving force from a motor, not shown. Then, based on detection of a sheet surface position detection sensor, not shown, disposed in the upper direction of the feed cassette 3, the uppermost surface of the sheet S stacked in the stacking tray 31 is transferred to a predetermined position where it is possible to feed the sheet.

In this embodiment, the cassette frame 30 is capable of selectively storing a sheet S1 of a letter size (refer to FIGS. 3 and 7B), that is an example of a first size, and a sheet S2 of an A4 size (refer to FIGS. 3 and 7A), that is an example of a second size. Further, the sheet feeding direction D3 is a short direction of the sheets S1 and S2, and a width direction W orthogonally intersecting with the sheet feeding direction D3 is a longitudinal direction of the sheets S1 and S2. Therefore, a length of the letter size sheet S1 in the sheet feeding direction D3 is a first value (216 mm), and a length in the width direction W is a second value (279 mm). Further, a length of the A4 size sheet S2 in the sheet feeding direction D3 is a third value (210 mm), which is shorter than the first value, and a length in the width direction W is a fourth value (297 mm), which is longer than the second value.

Trailing Edge Regulation Unit

The trailing edge regulation unit 40 includes a front side trailing edge regulation unit 41 regulating the front side D1 on a trailing edge side D4 of the sheet S and a back side trailing edge regulation unit 42 regulating the back side D2 on the trailing edge side D4 of the sheet S. While, in this embodiment, the trailing edge regulation unit 40 is integrally formed with the cassette frame 30, it is acceptable that a component formed independently from the cassette frame 30 is attached to the cassette frame 30. The front side and back side trailing edge regulation units 41 and 42 are formed approximately in a symmetrical shape with respect to a center line of the sheet S along the sheet feeding direction D3 as a center. Therefore, the back side trailing edge regulation unit 42 will be described in detail, and descriptions of the front side trailing edge regulation unit 41 will be omitted by putting the same reference characters herein.

Figure 3:
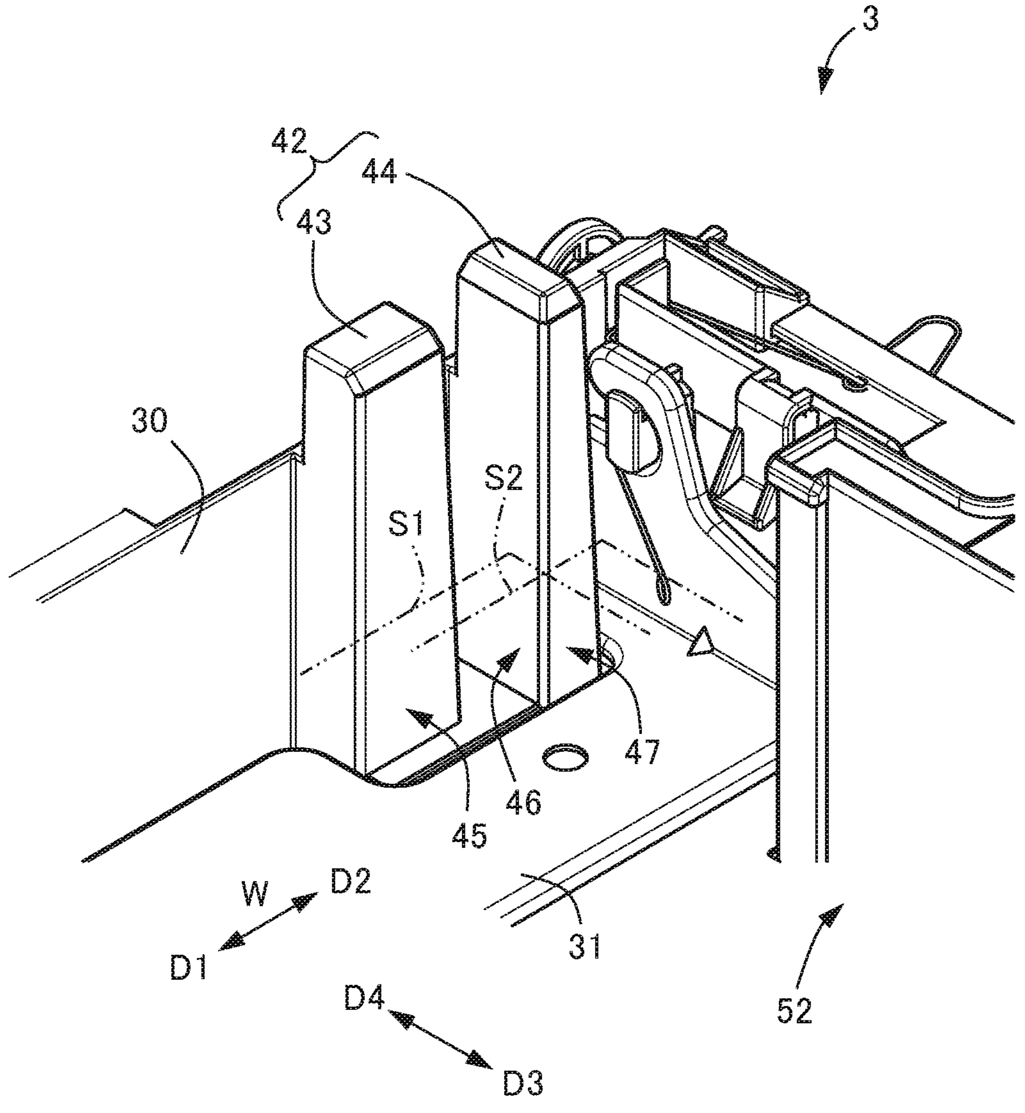
FIG. 3 is a perspective view showing a back side trailing edge regulation unit of the feed cassette relating to the first embodiment.

FIG. 3 is a diagram illustrating a configuration of the back side trailing edge regulation unit 42 relating to the first embodiment. As shown in FIG. 3, the back side trailing edge regulation unit 42 includes a first projection 43 and a second projection 44 disposed along the vertical direction of the cassette frame 30 as a longitudinal direction thereof and adjacent to each other in the width direction. The first projection 43 includes a first trailing edge regulation surface 45 directing to the sheet feeding direction D3. The second projection 44 includes a first side-edge regulation surface 46 directing to the front side D1 and a second trailing edge regulation surface 47 directing to the sheet feeding direction D3.

Figure 7B:
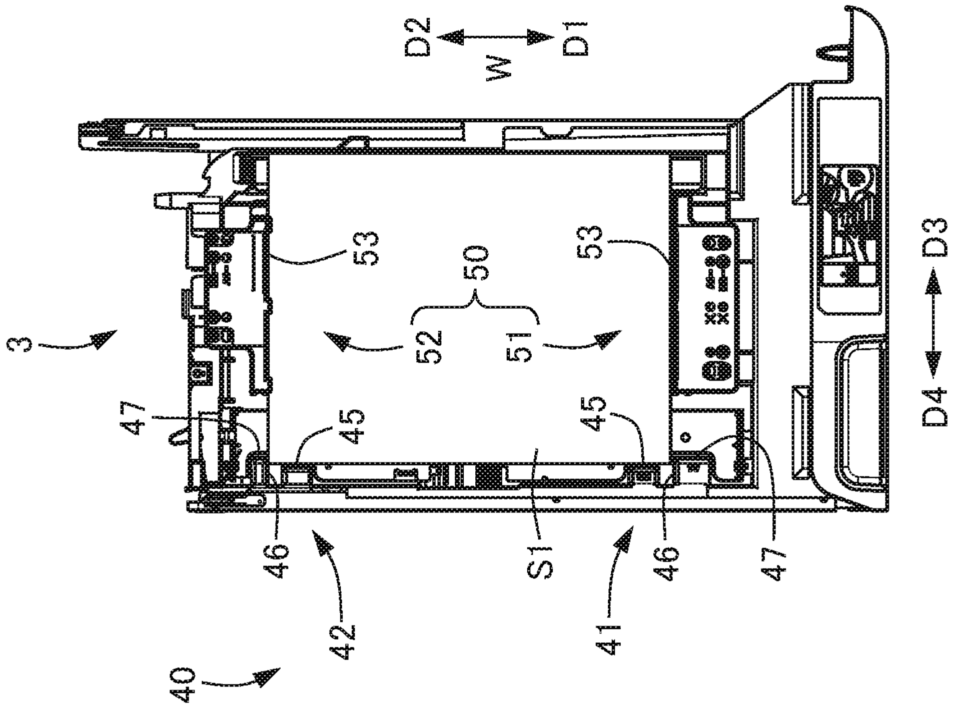
FIG. 7B is a plan view showing the feed cassette relating to the first embodiment in a case of storing the letter size sheet.

The first trailing edge regulation surface 45 regulates a position of a trailing edge (trailing edge D4) of the sheet S1 of the letter size stored in the feed cassette 3 in the sheet feeding direction D3 (refer to FIG. 7B). The second trailing edge regulation surface 47 is disposed downstream of the first trailing edge regulation surface 45 in the sheet feeding direction D3 and outside the sheet S1 of the letter size stored in the feed cassette 3 in the width direction W (refer to FIG. 7A). The second trailing edge regulation surface 47 regulates a position of a trailing edge (trailing edge D4) of the sheet S2 of the A4 size stored in the feed cassette 3 in the sheet feeding direction D3 (refer to FIG. 7A). The first side-edge regulation surface 46 is disposed downstream of the first trailing edge regulation surface 45 in the sheet feeding direction D3 and upstream of the second trailing edge regulation surface 47 in the sheet feeding direction D3. The first side-edge regulation surface 46 regulates a position of a side edge of the sheet S1 of the letter size stored in the feed cassette 3 in the width direction W.

To be noted, as shown in FIG. 2, the first side-edge regulation surface 46 and a first side-edge regulation surface 46 disposed in the front side trailing edge regulation unit 41 are disposed opposite each other, and configured as a pair of first side-edge regulation surfaces disposed on the front side D1 and the back side D2. Further, on an upper surface of the first projection 43 of the front side trailing edge regulation unit 41, an LTR (letter) mark 48*a* used as a mark onto which the trailing edge of the sheet S1 of the letter size is abutted is formed. Similarly, on an upper surface of the second projection 44 of the front side trailing edge regulation unit 41, an A4 mark 48*b* used as a mark onto which the trailing edge of the sheet S2 of the A4 size is abutted is formed.

Side Edge Regulation Member

The side edge regulation member 50 includes a front side regulation member 51 regulating the side edge of the sheet S on the front side D1 and a back side regulation member 52 regulating the side edge of the sheet S on the back side D2. The front side and back side regulation members 51 and 52 are disposed so as to regulate the positions of the side edges of the sheet S stored in the feed cassette 3 on the front side D1 and the back side D2, respectively. Since the front side and back side regulation members 51 and 52 are formed approximately in a symmetrical shape with respect to the center line of the sheet S along the sheet feeding direction D3 as a center, the back side regulation member 52 will be described in detail, and descriptions of the front side regulation member 51 will be omitted herein.

Figure 4:
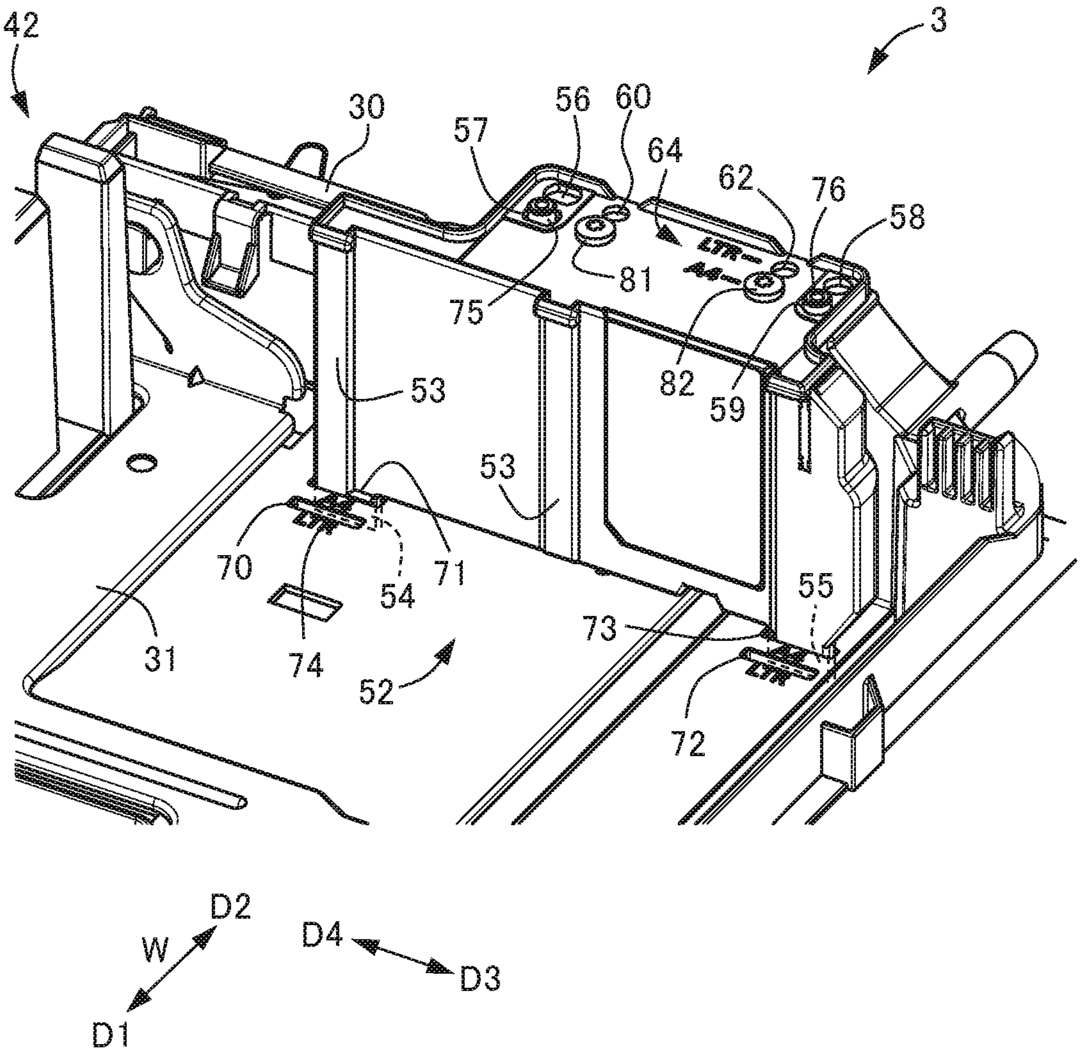
FIG. 4 is a perspective view showing a back side regulation member of the feed cassette relating to the first embodiment.
Figure 5A:
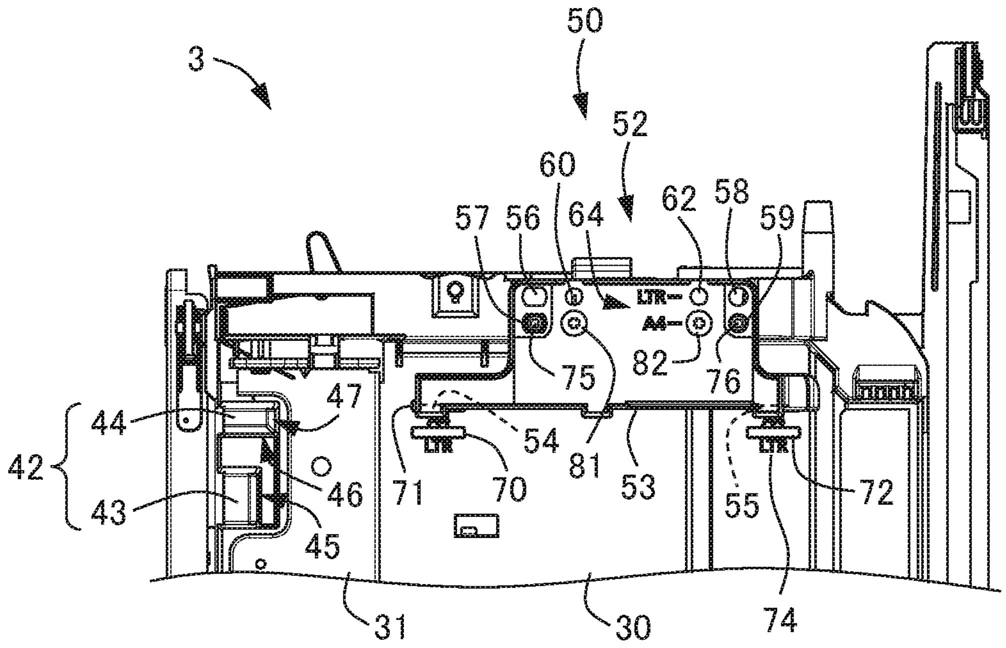
FIG. 5A is a plan view showing a back side of the feed cassette in a case of storing an A4 size sheet.
Figure 5B:
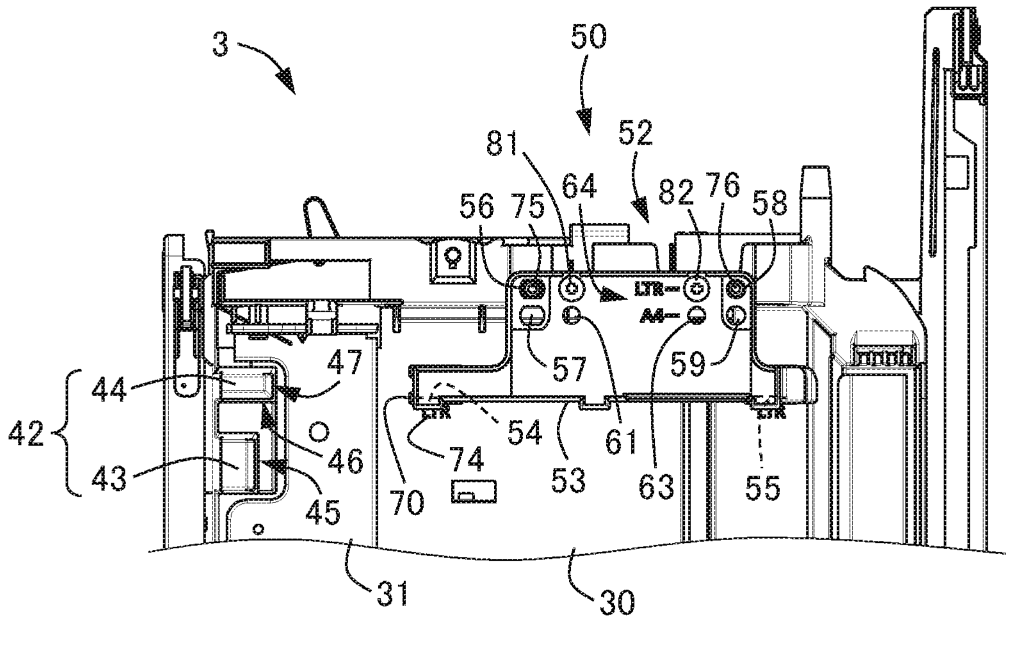
FIG. 5B is a plan view showing the back side of the feed cassette in a case of storing a letter size sheet.

FIG. 4 is a perspective view illustrating attaching of the back side regulation member 52 to the feed cassette 3 relating to the first embodiment. The back side regulation member 52 includes a regulation surface 53 coming into contact with the side edge of the sheet S on the back side D2, an upstream projection 54, and a downstream projection 55. The upstream projection 54 and the downstream projection 55 are projecting downwards and examples of engagement portions. An upstream first engagement hole 56, an upstream second engagement hole 57, a downstream first engagement hole 58, and a downstream second engagement hole 59 are formed on an upper surface of the back side regulation member 52. Further, an upstream first screw hole 60, an upstream second screw hole 61 (refer to FIG. 5B), a downstream first screw hole 62, a downstream second screw hole 63 (refer to FIG. 5B), and an upper surface display portion 64 are formed on the upper surface of the back side regulation member 52. The upper surface display portion 64 displays "LTR" indicating the letter size adjacent to the downstream first screw hole 62, and "A4" indicating the A4 size adjacent to the downstream second screw hole 63.

To be noted, the downstream first engagement hole 58 and the downstream second engagement hole 59 are approximately a circular shape, and the upstream first engagement hole 56 and the upstream second engagement hole 57 are approximately an elliptical shape in which the sheet feeding direction D3 is a longitudinal direction. Herewith, it is possible to absorb dimensional errors of components.

On the other hand, the cassette frame 30 includes an upstream third engagement hole 70 and a downstream third engagement hole 72, that are examples of first engaged portions, formed in a bottom surface, an upstream fourth engagement hole 71 and a downstream fourth engagement hole 73, that are examples of second engaged portions, formed in the bottom surface, and a bottom surface display portion 74. An upstream boss 75, a downstream boss 76, and female screw portions, not shown, are disposed on the upper surface of the cassette frame 30. The bottom surface display portion 74 displays "LTR" indicating the letter size in adjacent to the upstream third engagement hole 70 and the downstream third engagement hole 72, and "A4" indicating the A4 size in adjacent to the upstream fourth engagement hole 71 and the downstream fourth engagement hole 73.

The upstream projection 54 of the back side regulation member 52 is capable of selectively engaging with the upstream third engagement hole 70 and the upstream fourth engagement hole 71 of the cassette frame 30. The downstream projection 55 of the back side regulation member 52 is capable of selectively engaging with the downstream third engagement hole 72 and the downstream fourth engagement hole 73 of the cassette frame 30. The upstream first engagement hole 56 and the upstream second engagement hole 57 of the back side regulation member 52 are capable of selectively engaging with the upstream boss 75 of the cassette frame 30. The downstream first engagement hole 58 and the downstream second engagement hole 59 of the back side regulation member 52 are capable of selectively engaging with the downstream boss 76 of the cassette frame 30.

That is, in this embodiment, one of the pair of side edge regulation members 50 and the cassette frame 30 is the pair of side edge regulation members 50, and includes the upstream projection 54 and the downstream projection 55 as the engagement portions. Further, another of the pair of side edge regulation members 50 and the cassette frame 30 is the cassette frame 30, and includes the upstream third engagement hole 70 and the downstream third engagement hole 72 as the first engaged portions, and the upstream fourth engagement hole 71 and the downstream fourth engagement hole 73 as the second engaged portions. Then, in a case where the upstream projection 54 and the downstream projection 55 have respectively engaged with the upstream third engagement hole 70 and the downstream third engagement hole 72, the pair of side edge regulation members 50 are positioned at a first position. Further, in a case where the upstream projection 54 and the downstream projection 55 have respectively engaged with the upstream fourth engagement hole 71 and the downstream fourth engagement hole 73, the pair of side edge regulation members 50 are positioned at a second position.

Alternatively, one of the pair of side edge regulation members 50 and the cassette frame 30 is the cassette frame 30, and includes the upstream boss 75 and the downstream boss 76 as the engagement portions. Further, another side of the pair of side edge regulation members 50 and the cassette frame 30 is the pair of side edge regulation members 50, and includes the upstream first engagement hole 56 and the downstream first engagement hole 58, serving as the first engaged portions, and the upstream second engagement hole 57 and the downstream first engagement hole 58 as the second engaged portions. Then, in a case where the upstream boss 75 and the downstream boss 76 have respectively engaged with the upstream first engagement hole 56 and the downstream first engagement hole 58, the pair of side edge regulation members 50 are positioned at the first position. Further, in a case where the upstream boss 75 and the downstream boss 76 have respectively engaged with the upstream second engagement hole 57 and the downstream second engagement hole 59, the pair of side edge regulation members 50 are positioned at the second position.

Positioning of A4 Size

Procedures taken at a time of fixing the back side regulation member 52 by positioning at the second position of a storage position of the A4 size will be described. At first, a worker engages the upstream projection 54 with the upstream fourth engagement hole 71, and engages the downstream projection 55 with the downstream fourth engagement hole 73. At this time, since the bottom surface display portion 74 displays "A4" in adjacent to the upstream fourth engagement hole 71 and the downstream fourth engagement hole 73, attaching to a faulty position by the worker hardly occurs. Further, in parallel with attaching the upstream projection 54 and the downstream projection 55, the worker engages the upstream second engagement hole 57 with the upstream boss 75, and engages the downstream second engagement hole 59 with the downstream boss 76. That is, when the upstream and downstream projections 54 and 55, and the upstream and downstream second engagement holes 57 and 59 respectively engage with the upstream and downstream fourth engagement holes 71 and 73, and the upstream and downstream bosses 75 and 76, the back side regulation member 52 is positioned at the second position. At this time, since the back side regulation member 52 is positioned at the second position, the regulation surface 53 comes into contact with the side edge of the sheet S2 of the A4 size that is stored (refer to FIGS. 5A and 7A).

By positioning the back side regulation member 52 at the second position, the upstream and downstream second screw holes 61 and 63 are respectively positioned correspondingly to the female screw portions, not shown, of the cassette frame 30. Then, the worker fixes the back side regulation member 52 at the second position in the cassette frame 30 by fastening with bolts 81 and 82 while using "A4" displayed on the upper surface display portion 64 adjacent to the downstream second screw hole 63 as a mark.

Figure 6A:
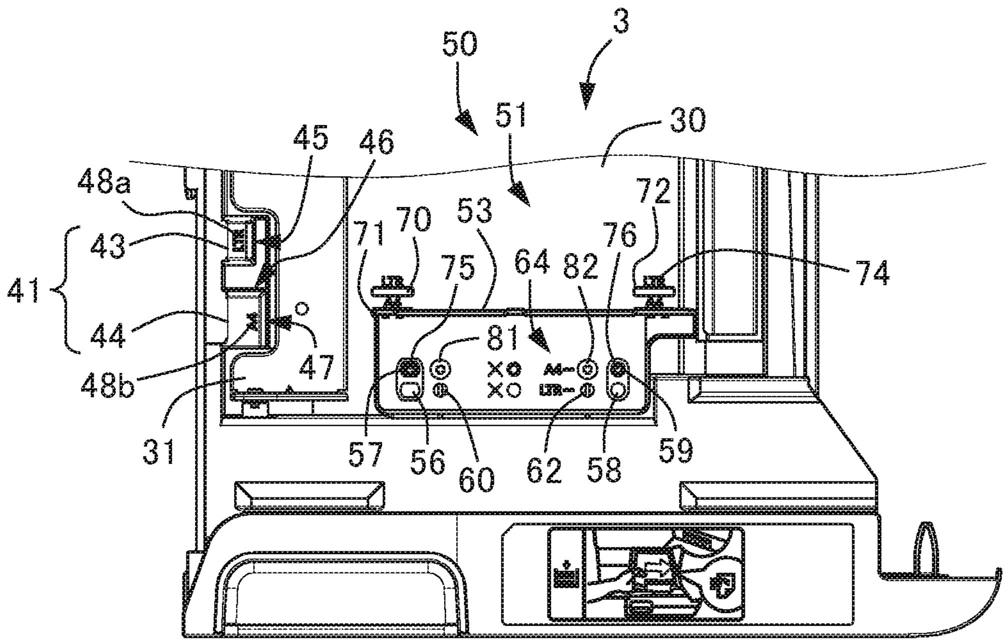
FIG. 6A is a plan view showing a front side of the feed cassette in a case of storing the A4 size sheet.

Similarly, the front side regulation member 51 is positioned and fixed to the cassette frame 30 (refer to FIG. 6A). That is, when the upstream and downstream projections 54 and 55, and the upstream and downstream second engagement holes 57 and 59 respectively engage with the upstream and downstream fourth engagement holes 71 and 73, and the upstream and downstream bosses 75 and 76, the front side regulation member 51 is positioned at the second position. At this time, since the front side regulation member 51 is positioned at the second position, the regulation surface 53 comes into contact with the side edge of the A4 size sheet S2 that is stored (refer to FIGS. 6A and 7A).

Positioning of Letter Size

Next, procedures taken at a time of fixing the back side regulation member 52 by positioning at the first position of a storage position of the letter size will be described. At first, the worker detaches the back side regulation member 52 from the cassette frame 30 by removing the bolts 81 and 82. Then, the worker engages the upstream projection 54 with the upstream third engagement hole 70, and engages the downstream projection 55 with the downstream third engagement hole 72. At this time, since the bottom surface display portion 74 displays "LTR" in adjacent to the upstream third engagement hole 70 and the downstream third engagement hole 72, attaching to a faulty position by the worker hardly occurs. Further, in parallel with attaching of the upstream projection 54 and the downstream projection 55, the worker engages the upstream first engagement hole 56 with the upstream boss 75, and engages the downstream first engagement hole 58 with the downstream boss 76. That is, when the upstream and downstream projections 54 and 55, and the upstream and downstream first engagement holes 56 and 58 respectively engage with the upstream and downstream third engagement holes 70 and 72, and the upstream and downstream bosses 75 and 76, the back side regulation member 52 is positioned at the first position. At this time, since the back side regulation member 52 is positioned at the first position, the regulation surface 53 comes into contact with the side edge of the sheet S1 of the letter size that is stored (refer to FIGS. 5B and 7B).

By positioning the back side regulation member 52 at the first position, the upstream first screw hole 60 and the downstream first screw hole 62 are respectively positioned correspondingly to the female screw portions, not shown, of the cassette frame 30. Then, the worker fixes the back side regulation member 52 at the first position in the cassette frame 30 by fastening with the bolts 81 and 82 while using "LTR" displayed by the upper surface display portion 64 adjacent to the downstream first screw hole 62 as a mark.

Figure 6B:
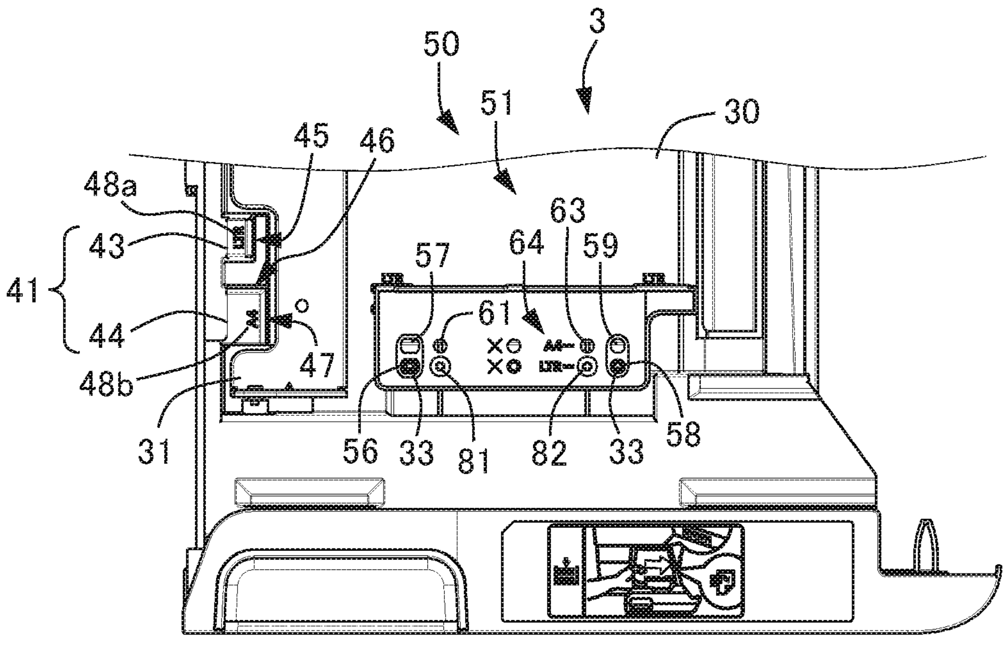
FIG. 6B is a plan view showing the front side of the feed cassette in a case of storing the letter size sheet.

Similarly, the front side regulation member 51 is positioned and fixed to the cassette frame 30 (refer to FIG. 6B). That is, when the upstream and downstream projections 54 and 55, and the upstream and downstream first engagement holes 56 and 58 respectively engage with the upstream and downstream third engagement holes 70 and 72, and the upstream and downstream bosses 75 and 76, the front side regulation member 51 is positioned at the first position. At this time, since the front side regulation member 51 is positioned at the first position, the regulation surface 53 comes into contact with the side edge of the sheet S1 of the letter size that is stored (refer to FIGS. 6B and 7B).

In this embodiment, as described above, the front side regulation member 51 and the back side regulation member 52, which are the pair of side edge regulation members 50, are respectively attached to the first and second positions in such a manner that is selectively detachable from the feed cassette 3. At this point, as shown in FIG. 7B, the first position is disposed downstream of the second trailing edge regulation surface 47 in the feed cassette 3 in the sheet feeding direction D3, and is a position which regulates the position of the side edge of the letter size sheet S1 in the width direction W. Further, as shown in FIG. 7A, the second position is disposed downstream of the second trailing edge regulation surface 47 in the feed cassette 3 in the sheet feeding direction D3, and is a position which regulates the position of the side edge of the A4 size sheet S2 in the width direction W.

Positional Regulation of Sheet

Figure 7A:
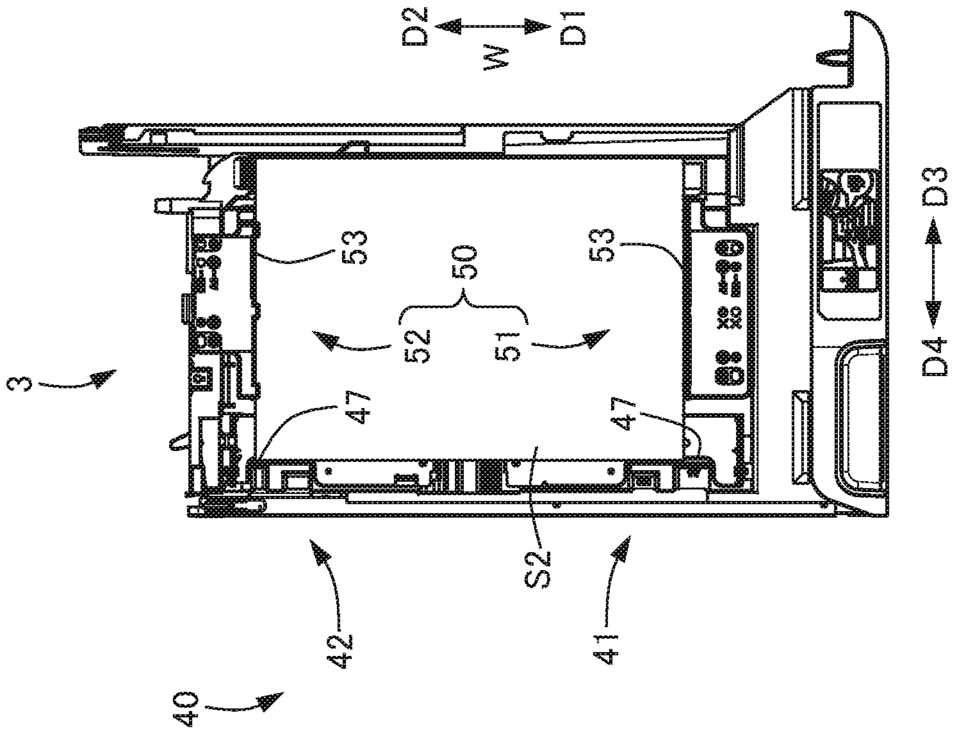
FIG. 7A is a plan view showing the feed cassette relating to the first embodiment in a case of storing the A4 size sheet.

FIGS. 7A and 7B are diagrams illustrating a positional regulation of the sheet stored in the feed cassette 3 relating to the first embodiment, and FIGS. 7A and 7B respectively illustrate states where the sheet S2 of the A4 size and the sheet S1 of the letter size are stored.

As shown in FIG. 7A, in a state where the front side and back side regulation members 51 and 52, which are the pair of side edge regulation members 50, are attached to the second position, the feed cassette 3 is capable of regulating the position of the A4 size sheet S2. At this time, the front side and back side regulation members 51 and 52 regulate the position of the sheet S2 in the width direction W, and the second trailing edge regulation surface 47 of the trailing edge regulation unit 40 regulates the position of the trailing edge of the sheet S2.

On the other hand, as shown in FIG. 7B, in a state where the front side regulation member 51 and the back side regulation member 52 of the pair of side edge regulation members 50 are attached to the first position, the feed cassette 3 is capable of regulating the positions of the sheet S1 of the letter size. At this time, the front side and back side regulation members 51 and 52 regulate the position of the sheet S1 in the width direction W, and the first side-edge regulation surface 46 of the trailing edge regulation unit 40 regulates the position of the trailing edge of the sheet S1.

As described above, by the feed cassette 3 of this embodiment, it is possible to detachably attach the front side and back side regulation members 51 and 52, which are the pair of side edge regulation members 50, to the first and second positions selectively. Herewith, it is possible to freely choose the regulatable size by the same feed cassette 3 between the A4 size and the letter size. Among sheet sizes which are used by users of the image forming apparatus, the sizes of high usage ratios in the world are classified into the A4 size (for example, Japan, Asia, Europe) and the letter size (for example, North America). Therefore, usability of the feed cassette 3 capable of choosing the regulations of the A4 size and the letter size by the same feed cassette is high, and, since it is possible to eliminate side edge regulation members and trailing edge regulation units slidably movable with respect to the feed cassette 3, it is possible to reduce a number of components and a cost.

Further, by the feed cassette 3 of this embodiment, in comparison with a case where a pair of the side regulation members are slidable and capable of positioning the sheet at any positions, it is possible to suppress defects such as defective conveyance and image defects caused by not being fixed appropriately at a position corresponding to the size of the stored sheet. Similarly, by the feed cassette 3 of this embodiment, the trailing edge regulation unit 40 is fixed to the feed cassette 3. Therefore, in comparison with a case where a trailing edge regulation unit is slidable and capable of positioning the sheet at any positions, it is possible to suppress defects such as the defective conveyance and the image defects caused by not being fixed appropriately at a position corresponding to the size of the stored sheet.

Figure 8:
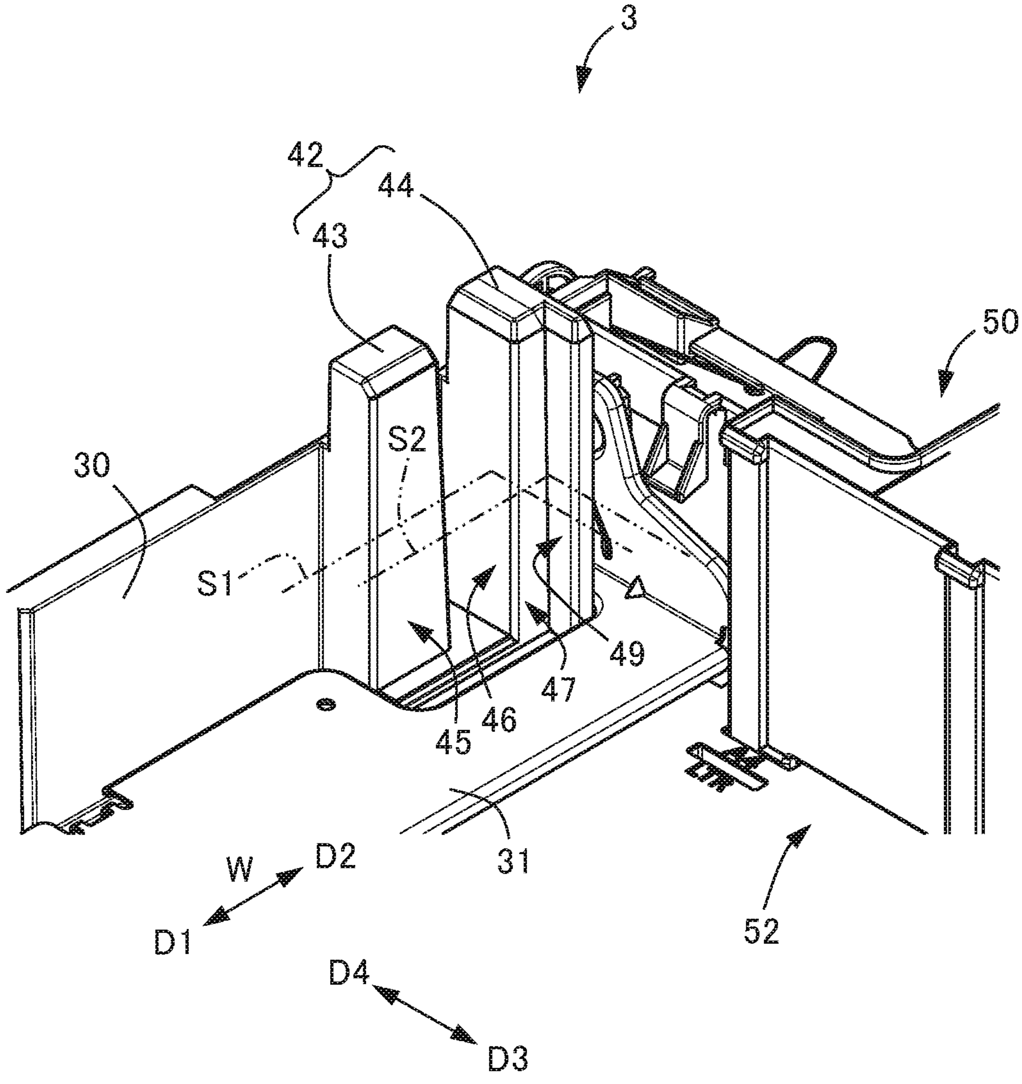
FIG. 8 is a perspective view showing a back side trailing edge regulation unit of the feed cassette relating to a modification example of the first embodiment.

To be noted, while, with respect to the feed cassette 3 of this embodiment described above, the case where the front side and back side trailing edge regulation units 41 and 42 of the trailing edge regulation unit 40 include the first trailing edge regulation surface 45, the first side-edge regulation surface 46, and the second trailing edge regulation surface 47 is described, it is not limited to this. For example, as shown in FIG. 8, it is acceptable that the front side and back side trailing edge regulation units 41 and 42 include a second side-edge regulation surface 49 in addition to the first trailing edge regulation surface 45, the first side-edge regulation surface 46, and the second trailing edge regulation surface 47. In this case, the second projection 44 includes the first side-edge regulation surface 46, the second trailing edge regulation surface 47, and the second side-edge regulation surface 49 directing to the front side D1.

In the feed cassette 3, the second side-edge regulation surface 49 is disposed downstream of the second trailing edge regulation surface 47 in the sheet feeding direction D3 and upstream of the side edge regulation member 50 in the sheet feeding direction D3. The second side-edge regulation surface 49 regulates the position of the side edge of the A4 size sheet S2 in the width direction W on a trailing edge side D4. To be noted, while not shown, the second side-edge regulation surface 49 and a second side-edge regulation surface disposed on the front side trailing edge regulation unit 41 are disposed opposite each other, and configured as a pair of second side-edge regulation surfaces 49 disposed on the front side D1 and the back side D2.

Figure 9:
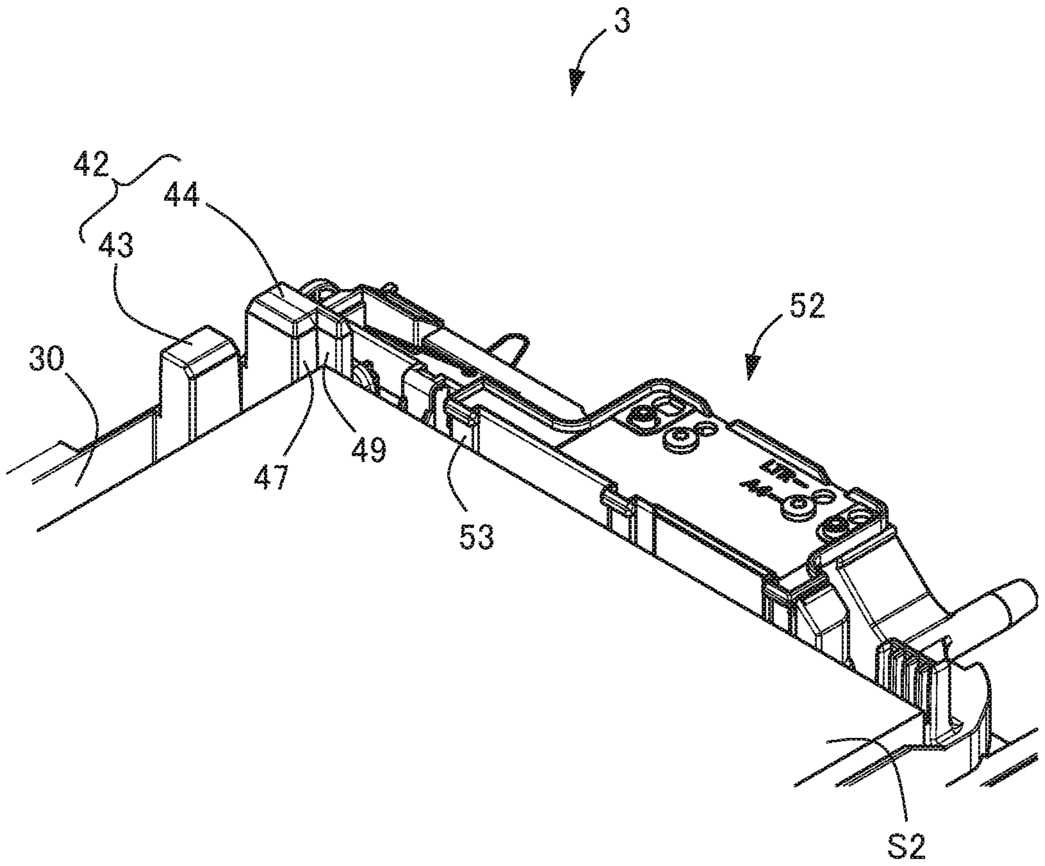
FIG. 9 is a perspective view showing a back side regulation member and the back side trailing edge regulation unit of the feed cassette relating to the modification example of the first embodiment.

In this case, as shown in FIG. 9, in a state where the back side regulation member 52 and the front side regulation member, not shown, are attached to the second position, the feed cassette 3 is capable of regulating the position of the sheet S2 of the A4 size. At this time, the front side regulation member, the back side regulation member 52, and the second side-edge regulation surface 49 of the trailing edge regulation unit 40 regulate the position of the sheet S2 of the A4 size in the width direction W, and the second trailing edge regulation surface 47 regulates the position of the trailing edge of the sheet S2.

Second Embodiment

Next, with reference to FIGS. 10 to 12B, a second embodiment of this disclosure will be described in detail.

The second embodiment is different from the first embodiment at a point where a feed cassette 103 of this embodiment includes a pair of side edge regulation units 10 fixed to the cassette frame 30 and a pair of side edge regulation members 20 detachable from the pair of side edge regulation units 10. However, since other configurations are similar to the first embodiment, detailed descriptions will be omitted herein by using the same reference characters.

Side Edge Regulation Unit

Figure 10:
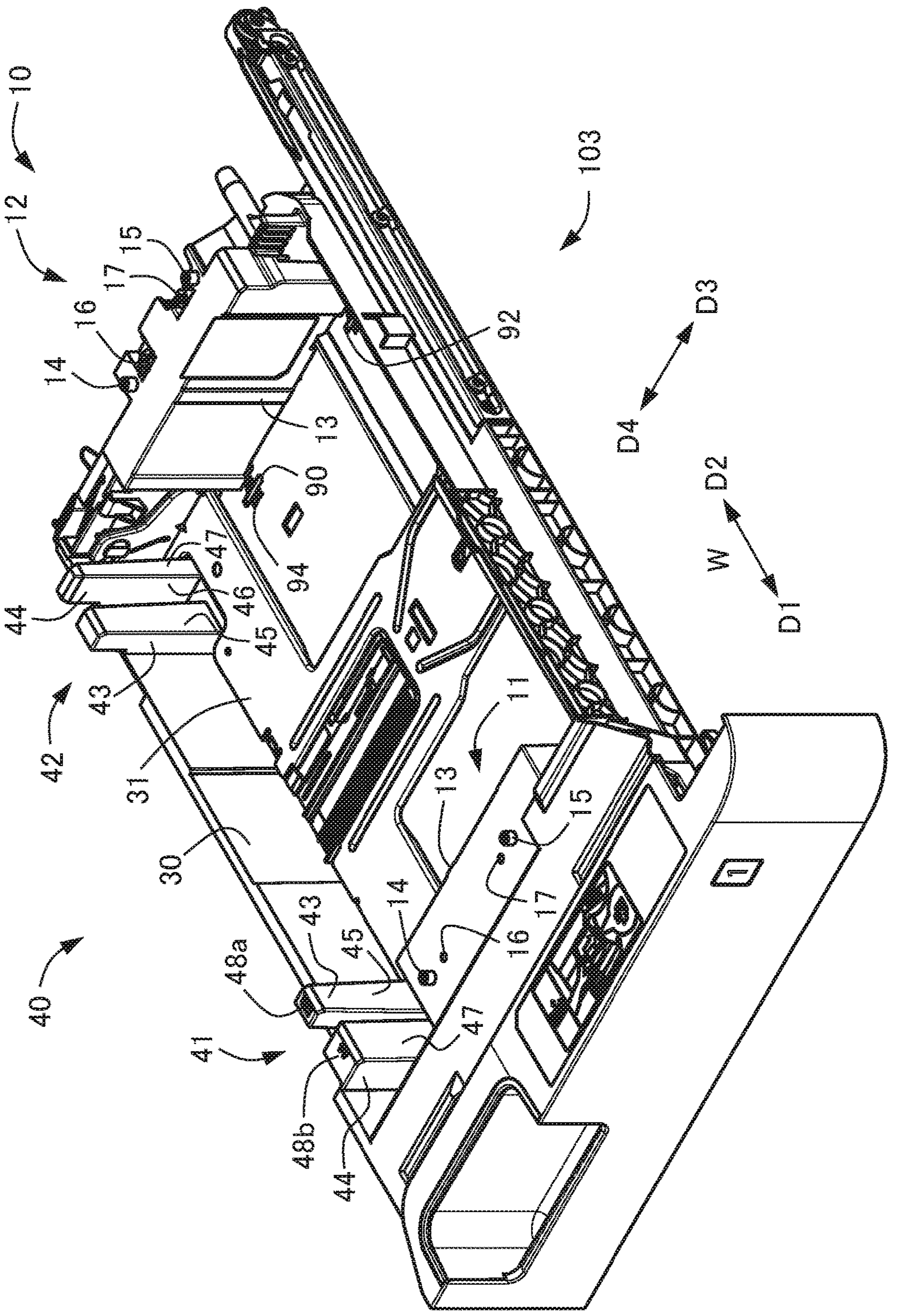
FIG. 10 is a perspective view showing a side edge regulation unit of a feed cassette relating to a second embodiment in a case of storing the A4 size sheet.

FIG. 10 is a perspective view showing the pair of side edge regulation units 10 relating to the second embodiment. The side edge regulation unit 10 includes a front side regulation unit 11 regulating the side edge of the sheet S on the front side D1 and a back side regulation unit 12 regulating the side edge of the sheet S on the back side D2. The front side and back side regulation units 11 and 12 are disposed so as to regulate the positions of the side edges of the sheet S stored in the feed cassette 103 in the width direction W on the front side D1 and the back side D2, respectively.

By this embodiment, the pair of side edge regulation units 10 are disposed downstream of the second trailing edge regulation surface 47 in the cassette frame 30 in the sheet feeding direction D3 by being fixed to the cassette frame 30. Further, the pair of side edge regulation units 10 are disposed opposite each other so as to regulate the positions of the side edges of the sheet S2 of the A4 size stored in the cassette frame 30 in the width direction W (refer to FIG. 12A). To be noted, since the front side and back side regulation units 11 and 12 are formed approximately in a symmetrical shape with respect to the center line of the sheet S along the sheet feeding direction D3 as a center, the back side regulation unit 12 will be described in detail, and descriptions of the front side regulation unit 11 will be omitted herein.

The back side regulation unit 12 is disposed by being fixed, while projecting upwards from the back side D2, to the bottom portion of the cassette frame 30, and includes a regulation surface 13 coming into contact with the side edge of the sheet S2 on the back side D2, an upstream boss 14, a downstream boss 15, an upstream female screw portion 16, and a downstream female screw portion 17. An upstream engagement hole 90, a downstream engagement hole 92, and a bottom surface display portion 94 are formed in the bottom portion of the cassette frame 30. The bottom surface display portion 94 displays "LTR" indicating the letter size adjacent to the upstream engagement hole 90 and the downstream engagement hole 92, and "A4" indicating the A4 size adjacent to the regulation surface 13 of the back side regulation unit 12.

Side Edge Regulation Member

Figure 11:
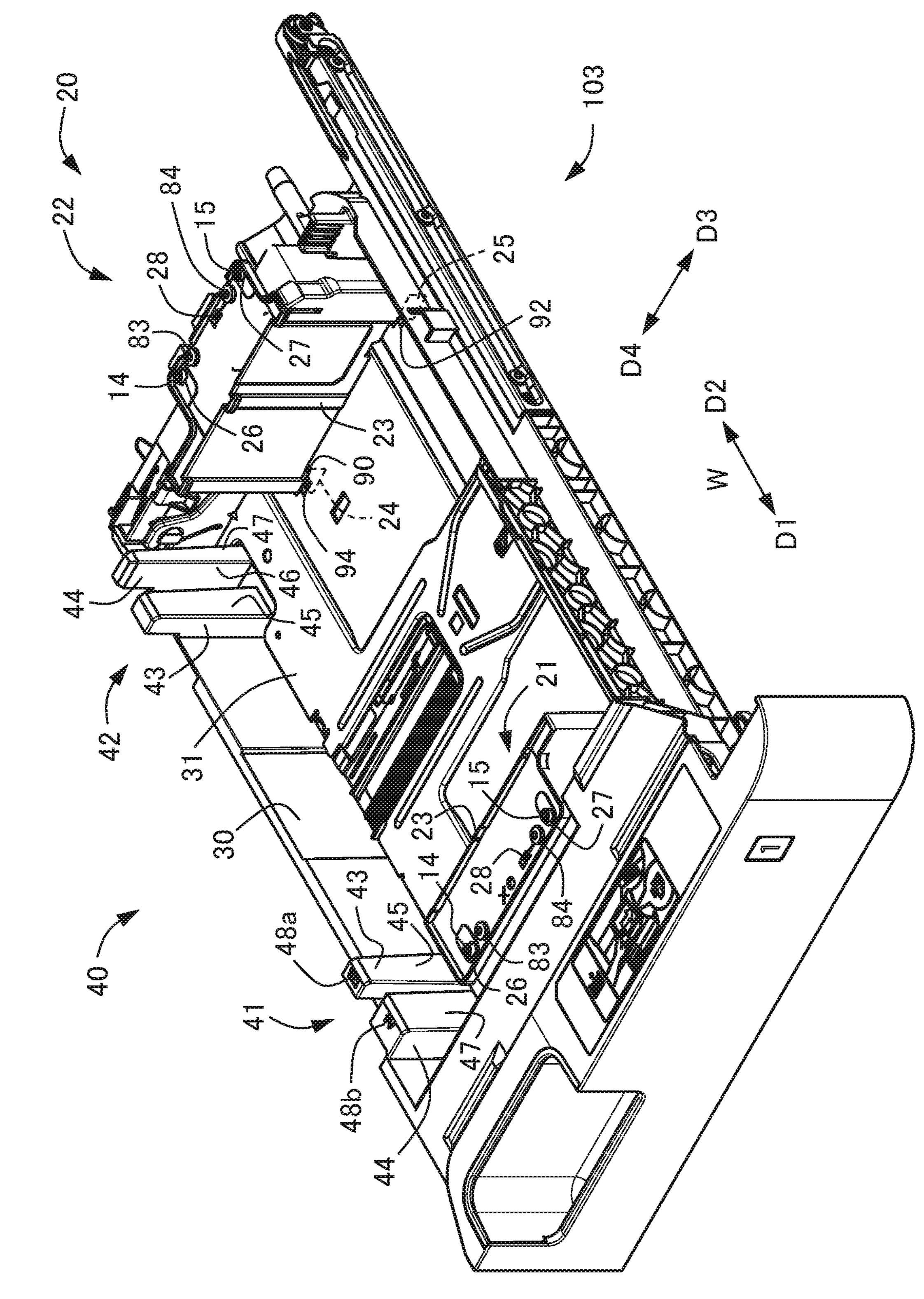
FIG. 11 is a perspective view showing a side edge regulation member of the feed cassette relating to the second embodiment in a case where the side edge regulation member is attached so as to store the letter size sheet.

FIG. 11 is a perspective view showing the pair of side edge regulation members 20 relating to the second embodiment. The side edge regulation member 20 includes a front side regulation member 21 regulating the side edge of the sheet S on the front side D1 and a back side regulation member 22 regulating the side edge of the sheet S on the back side D2. The front side and back side regulation members 21 and 22 are disposed so as to regulate the positions of the side edges of the sheet S stored in the feed cassette 103 in the width direction W on the front side D1 and the back side D2, respectively.

By this embodiment, the pair of side edge regulation members 20 are detachably disposed with respect to the pair of side edge regulation units 10. The pair of side edge regulation members 20 are disposed opposite each other so as to, in a case attached to the pair of side edge regulation units 10, regulate the positions of the side edges of the sheet S1 of the letter size stored in the cassette frame 30 in the width direction W (refer to FIG. 12B). To be noted, since the front side and back side regulation members 21 and 22 are formed approximately in a symmetrical shape with respect to the center line of the sheet S along the sheet feeding direction D3 as a center, the back side regulation member 22 will be described in detail, and descriptions of the front side regulation member 21 will be omitted herein.

The back side regulation member 22 includes a regulation surface 23 coming into contact with the side edge of the sheet Son the back side D2, and upstream and downstream projection portions 24 and 25 projecting downwards. Upstream and downstream engagement holes 26 and 27, upstream and downstream screw holes, not shown, and an upper surface display portion 28 are formed on an upper surface of the back side regulation member 22. The upper surface display portion 28 displays "LTR" indicating the letter size adjacent to the downstream screw hole. To be noted, the downstream engagement hole 27 is approximately the circular shape, and the upstream first engagement hole 56 and the upstream engagement hole 26 is approximately the elliptical shape in which a longitudinal direction is the sheet feeding direction D3. Herewith, it is possible to absorb the dimensional errors of components.

The upstream projection portion 24 of the back side regulation member 22 is capable of engaging with the upstream engagement hole 90 of the cassette frame 30. The downstream projection portion 25 of the back side regulation member 22 is capable of engaging with the downstream engagement hole 92 of the cassette frame 30. Further, the upstream engagement hole 26 of the back side regulation member 22 is capable of engaging with the upstream boss 14 of the cassette frame 30. The downstream engagement hole 27 of the back side regulation member 22 is capable of engaging with the downstream boss 15 of the cassette frame 30.

Positioning of Sheet

Figure 12B:
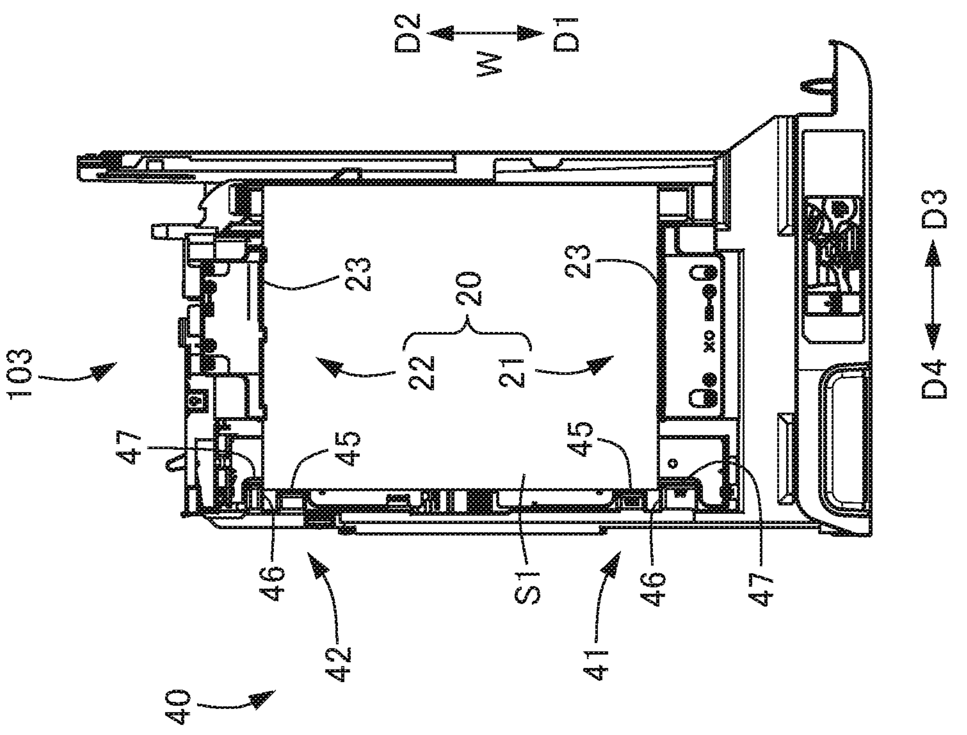
FIG. 12B is a plan view showing the feed cassette relating to the second embodiment in a state of the storage of the letter size sheet.
Figure 12A:
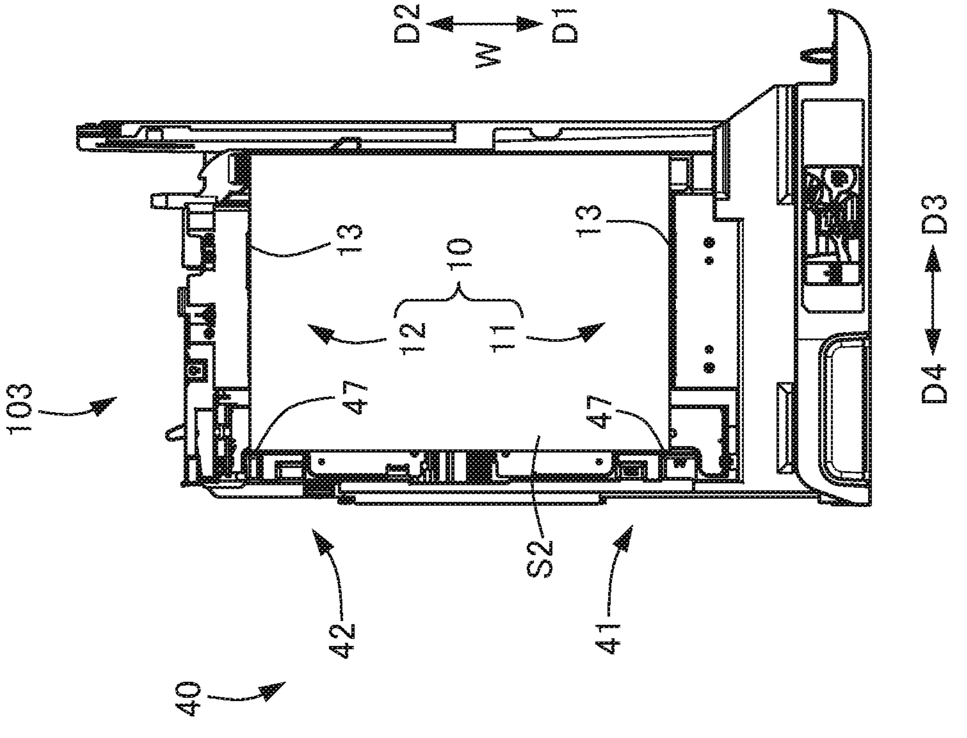
FIG. 12A is a plan view showing the feed cassette relating to the second embodiment in a state of storage of the A4 size sheet.

As shown in FIG. 10, in a case where the pair of side edge regulation members 20 are not attached to the pair of side edge regulation units 10, it is possible to store the sheet S2 of the A4 size (refer to FIG. 12A). On the other hand, as shown in FIG. 11, in a case where the pair of side edge regulation members 20 are attached to the pair of side edge regulation units 10, it is possible to store the sheet S1 of the letter size (refer to FIG. 12B).

Procedures taken at a time of fixing the pair of side edge regulation members 20 by attaching to the pair of side edge regulation units 10 will be described by using FIGS. 10 and 11. At first, a worker engages the upstream projection portion 24 with the upstream engagement hole 90, and engages the downstream projection portion 25 with the downstream engagement hole 92. At this time, since the bottom surface display portion 94 displays "LTR" adjacent to the upstream engagement hole 90 and the downstream engagement hole 92, attaching to a faulty position by the worker hardly occurs. Further, in parallel with attaching the upstream projection portion 24 and the downstream projection portion 25, the worker engages the upstream and downstream engagement holes 26 and 27 with the upstream and downstream bosses 14 and 15, respectively. As described above, when the upstream and downstream projection portions 24 and 25, and the upstream and downstream engagement holes 26 and 27 respectively engage with the upstream and downstream engagement holes 90 and 92, and the upstream and downstream bosses 14 and 15, the back side regulation member 22 is positioned. At this time, since the back side regulation member 22 is positioned, the regulation surface 23 comes into contact with the side edge of the sheet S1 of the letter size that is stored (refer to FIG. 12B).

By positioning the back side regulation member 22, the upstream and downstream screw holes, not shown, are positioned corresponding to the upstream and downstream female screw portions 16 and 17 of the cassette frame 30. Then, the worker fixes the back side regulation member 22 to the cassette frame 30 by fastening with bolts 83 and 84 while using "LTR" displayed by the upper surface display portion 28 adjacent to the downstream screw hole as the mark.

Similarly, the front side regulation member 21 is fixed by positioning to the cassette frame 30. That is, when the upstream and downstream projection portions, and the upstream and downstream engagement holes 26 and 27 of the front side regulation member 21 respectively engage with the upstream and downstream engagement holes, and the upstream and downstream bosses 14 and 15 of the front side regulation member 21, the front side regulation member 21 is positioned. At this time, since the front side regulation member 21 is positioned, the regulation surface 23 comes into contact with the side edge of the sheet S1 of the letter size that is stored (refer to FIG. 12B).

Regulation of Position of Sheet

FIGS. 12A and 12B are diagrams illustrating a positional regulation of the sheet stored in the feed cassette 103 relating to the second embodiment, and FIGS. 12A and 12B respectively illustrate states where the sheet S2 of the A4 size and the sheet S1 of the letter size are stored.

As shown in FIG. 12A, in a state where the side edge regulation member 20 is not attached to the front side and back side regulation units 11 and 12, which are the pair of side edge regulation units 10, the feed cassette 103 is capable of regulating the position of the sheet S2 of the A4 size. At this time, the front side and back side regulation units 11 and 12 regulate the positions of the sheet S2 in the width direction W, and the second trailing edge regulation surface 47 of the trailing edge regulation member 40 regulates the position of the trailing edge of the sheet S2.

On the other hand, as shown in FIG. 7B, in a state where the front side and back side regulation members 21 and 22, which are the pair of side edge regulation members 20, are attached to the pair of side edge regulation units 10, the feed cassette 103 is capable of regulating the position of the sheet S1 of the letter size. At this time, the front side and back side regulation members 21 and 22 regulate the positions of the sheet S1 in the width direction W, and the first side-edge regulation surface 46 of the trailing edge regulation member 40 regulates the position of the trailing edge of the sheet S1.

As described above, by the feed cassette 103 of this embodiment, it is possible to attach and detach the pair of side edge regulation members 20 to and from the pair of side edge regulation units 10. Herewith, it is possible to freely choose a regulatable size by the same feed cassette 103 between the A4 size and the letter size. Among the sheet sizes which are used by the users of the image forming apparatus, the sizes of the high usage ratios in the world are classified into the A4 size (for example, Japan, Asia, Europe) and the letter size (for example, North America). Therefore, usability of the feed cassette 103 capable of choosing the regulations of the A4 size and the letter size by the same feed cassette is high, and, since it is possible to eliminate side edge regulation members and trailing edge regulation members slidably movable with respect to the feed cassette 103, it is possible to reduce a number of components and a cost.

To be noted, while the case where the side edge regulation member 20 is detachably disposed to the side edge regulation unit 10 is described, it is not limited to this, and it is acceptable that the side edge regulation member 20 is detachably disposed to portions other than the side edge regulation unit 10. In this case, it is also possible to configure the side edge regulation member 20 so as to, at a time of attachment to the side edge regulation unit 10, regulate the position of the side edge of the sheet S1 of the letter size stored in the cassette frame 30.

Further, while the case where the sheet feeding direction D3 is the short direction of the sheets S1 and S2 as described in the first and second embodiments above, it is not limited to this, and it is acceptable that the sheet feeding direction D3 is the longitudinal direction of the sheets S1 and S2. In this case, in each of the embodiments, the first size is the A4 size, and the second size is the letter size.

Further, while, in the first and second embodiments described above, the A4 size and the letter size are applied as the sheets of the high usage ratios, it is not limited to this, and it is acceptable to apply other sizes. For example, it is also possible to apply the A4 size and the legal size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-152982, filed Sep. 11, 2020, which is hereby incorporated by reference herein in its entirety.

What is claimed is:

1. A sheet cassette storing a sheet to be fed in a sheet feeding direction, the sheet cassette comprising:

a cassette frame configured to selectively store the sheet of a first size and the sheet of a second size, a length of the sheet of the first size in the sheet feeding direction being a first value, a length of the sheet of the first size in a width direction orthogonally intersecting with the sheet feeding direction being a second value, a length of the sheet of the second size in the sheet feeding direction being a third value that is shorter than the first value, and a length of the sheet of the second size in the width direction being a fourth value that is longer than the second value;

a liftable tray, disposed in the cassette frame, on which the sheet is placed, wherein the tray has a notch;

a first trailing edge regulator that is integrally formed with the cassette frame and configured to regulate a trailing edge of the sheet of the first size on the tray in the sheet feeding direction by abutting against the trailing edge of the sheet of the first size in the sheet feeding direction;

a second trailing edge regulator that is integrally formed with the cassette frame, disposed downstream of the first trailing edge regulator in the sheet feeding direction and outside the sheet of the first size stored in the cassette frame in the width direction, and configured to regulate a trailing edge of the sheet of the second size on the tray in the sheet feeding direction by abutting against the trailing edge of the sheet of the second size in the sheet feeding direction, wherein the second trailing edge regulator is arranged in the notch of the tray; and a pair of side edge regulation members that are opposite each other and disposed, in the cassette frame, downstream of the second trailing edge regulator in the sheet feeding direction, the pair of side edge regulation members being configured to be selectively detachably attached to a first position and a second position, the pair of side edge regulation members regulating side edges of the sheet of the first size stored in the cassette frame in the width direction at the first position, and the pair of side edge regulation members regulating side edges of the sheet of the second size stored in the cassette frame in the width direction at the second position.

2. The sheet cassette according to claim 1, wherein one of the cassette frame and the pair of side edge regulation members includes an engagement portion, wherein the other of the cassette frame and the pair of side edge regulation members includes a first engaged portion and a second engaged portion, wherein in a case where the engagement portion engages with the first engaged portion, the pair of side edge regulation members are positioned at the first position, and wherein in a case where the engagement portion engages with the second engaged portion, the pair of side edge regulation members are at the second position.

3. The sheet cassette according to claim 1, further comprising:

a pair of first side-edge regulators that are opposite each other, integrally formed with the cassette frame, and disposed downstream of the first trailing edge regulator in the sheet feeding direction and upstream of the second trailing edge regulator in the sheet feeding direction, the pair of first side-edge regulators being configured to regulate the side edges of the sheet of the first size stored in the cassette frame in the width direction; and a pair of second side-edge regulators that are opposite each other, integrally formed with the cassette frame, and disposed downstream of the second trailing edge regulator in the sheet feeding direction and upstream of the pair of side edge regulation members in the sheet feeding direction, the pair of second side-edge regulators being configured to regulate the side edges of the sheet of the second size stored in the cassette frame in the width direction.

4. The sheet cassette according to claim 1, wherein the first size comprises a letter size, wherein the cassette frame is configured to store the sheet of the letter size in such a manner that a short side of the letter size is along the sheet feeding direction, wherein the second size comprises an A4 size, and wherein the cassette frame is configured to store the sheet of the A4 size in such a manner that a short side of the A4 size is along the sheet feeding direction.

5. The sheet cassette according to claim 1, wherein the cassette frame includes a bottom portion and a wall which extends upward from the bottom portion, and wherein at least one of the pair of side edge regulation members is fastened with a bolt to a top portion of the wall.

6. The sheet cassette according to claim 1, wherein at least one of the pair of side edge regulation members includes a first index indicating the first size of the sheet and a second index indicating the second size of the sheet, wherein the side edge regulation member which includes the first and second indexes and attached to the first position is fastened to the cassette frame with a bolt which corresponds to a position of the first index, and wherein the side edge regulation member which includes the first and second indexes and attached to the second position is fastened to the cassette frame with a bolt which corresponds to a position of the second index.

7. The sheet cassette according to claim 1, wherein the cassette frame includes a bottom portion which has a first hole, and a wall which extends upward from the bottom portion and has a boss, wherein at least one of the pair of the side edge regulation members includes a second hole to which the boss inserts in a state where the side edge regulation member is attached to the cassette frame, and wherein at least one of the pair of the side edge regulation members includes a projection which inserts to the first hole in a state where the side edge regulation member is attached to the cassette frame.

8. The sheet cassette according to claim 1, wherein the cassette frame is formed in a shape of a casing opening upward.

9. The sheet cassette according to claim 1, wherein the first trailing edge regulator is arranged in the notch of the tray.

10. The sheet cassette according to claim 1, further comprising:

a third trailing edge regulator that is integrally formed with the cassette frame and configured to regulate the trailing edge of the sheet of the first size on the tray in the sheet feeding direction by abutting against the trailing edge of the sheet of the first size in the sheet feeding direction, wherein the third trailing edge regulator is arranged at an opposite side of the first trailing edge regulator in regard to a center of the cassette frame in the width direction; and a fourth trailing edge regulator that is integrally formed with the cassette frame, disposed downstream of the first trailing edge regulator in the sheet feeding direction and outside the sheet of the first size stored in the cassette frame in the width direction, and configured to regulate the trailing edge of the sheet of the second size on the tray in the sheet feeding direction by abutting against the trailing edge of the sheet of the second size in the sheet feeding direction, wherein the fourth trailing edge regulator is arranged at an opposite side of the second trailing edge regulator in regard to the center of the cassette frame in the width direction, wherein the tray has a second notch, and wherein the fourth trailing edge regulator is arranged in the second notch of the tray.

11. The sheet cassette according to claim 10, wherein the first trailing edge regulator is arranged in the notch of the tray, and wherein the third trailing edge regulator is arranged in the second notch of the tray.

12. An image forming apparatus comprising:

a cassette frame configured to selectively store a sheet of a first size and a sheet of a second size, a length of the sheet of the first size in a sheet feeding direction being a first value, a length of the sheet of the first size in a width direction orthogonally intersecting with the sheet feeding direction being a second value, a length of the sheet of the second size in the sheet feeding direction being a third value that is shorter than the first value, and a length of the sheet of the second size in the width direction being a fourth value that is longer than the second value;

a liftable tray, disposed in the cassette frame, on which the sheet is placed, wherein the tray has a notch;

a first trailing edge regulator that is integrally formed with the cassette frame and configured to regulate a trailing edge of the sheet of the first size on the tray in the sheet feeding direction by abutting against the trailing edge of the sheet of the first size in the sheet feeding direction;

a second trailing edge regulator that is integrally formed with the cassette frame, disposed downstream of the first trailing edge regulator in the sheet feeding direction and outside the sheet of the first size stored in the cassette frame in the width direction, and configured to regulate a trailing edge of the sheet of the second size on the tray in the sheet feeding direction by abutting against the trailing edge of the sheet of the second size in the sheet feeding direction, wherein the second trailing edge regulator is arranged in the notch of the tray;

a pair of side edge regulation members that are opposite each other and disposed, in the cassette frame, downstream of the second trailing edge regulator in the sheet feeding direction, the pair of side edge regulation members being configured to be selectively detachably attached to a first position and a second position, the pair of side edge regulation members regulating side edges of the sheet of the first size stored in the cassette frame in the width direction at the first position, and the pair of side edge regulation members regulating side edges of the sheet of the second size stored in the cassette frame in the width direction at the second position;

a sheet conveyer configured to feed the sheet stored in the cassette frame; and an image former configured to form an image on the sheet fed by the sheet conveyer from the cassette frame.

13. A sheet cassette storing a sheet to be fed in a sheet feeding direction, the sheet cassette comprising:

a cassette frame configured to selectively store the sheet of a first size and the sheet of a second size, a length of the sheet of the first size in the sheet feeding direction being a first value, a length of the sheet of the first size in a width direction orthogonally intersecting with the sheet feeding direction being a second value, a length of the sheet of the second size in the sheet feeding direction being a third value that is shorter than the first value, and a length of the sheet of the second size in the width direction being a fourth value that is longer than the second value;

a liftable tray, disposed in the cassette frame, on which the sheet is placed, wherein the tray has a notch;

a first trailing edge regulator that is integrally formed with the cassette frame and configured to regulate a trailing edge of the sheet of the first size on the tray in the sheet feeding direction by abutting against the trailing edge of the sheet of the first size in the sheet feeding direction;

a second trailing edge regulator that is integrally formed with the cassette frame, disposed downstream of the first trailing edge regulator in the sheet feeding direction and outside the sheet of the first size stored in the cassette frame in the width direction, and configured to regulate a trailing edge of the sheet of the second size on the tray in the sheet feeding direction by abutting against the trailing edge of the sheet of the second size in the sheet feeding direction, wherein the second trailing edge regulator is arranged in the notch of the tray; and a pair of side edge regulators that are opposite each other and disposed, in the cassette frame, downstream of the second trailing edge regulator in the sheet feeding direction, the pair of side edge regulators being configured to regulate side edges of the sheet on the tray in the width direction.

14. The sheet cassette according to claim 13, wherein the first trailing edge regulator is arranged in the notch of the tray.

15. The sheet cassette according to claim 13, further comprising:

a third trailing edge regulator that is integrally formed with the cassette frame and configured to regulate the trailing edge of the sheet of the first size on the tray in the sheet feeding direction by abutting against the trailing edge of the sheet of the first size in the sheet feeding direction, wherein the third trailing edge regulator is arranged at an opposite side of the first trailing edge regulator in regard to a center of the cassette frame in the width direction; and a fourth trailing edge regulator that is integrally formed with the cassette frame, disposed downstream of the first trailing edge regulator in the sheet feeding direction and outside the sheet of the first size stored in the cassette frame in the width direction, and configured to regulate the trailing edge of the sheet of the second size on the tray in the sheet feeding direction by abutting against the trailing edge of the sheet of the second size in the sheet feeding direction, wherein the fourth trailing edge regulator is arranged at an opposite side of the second trailing edge regulator in regard to the center of the cassette frame in the width direction, wherein the tray has a second notch, and wherein the fourth trailing edge regulator is arranged in the second notch of the tray.

16. The sheet cassette according to claim 15, wherein the first trailing edge regulator is arranged in the notch of the tray, and wherein the third trailing edge regulator is arranged in the second notch of the tray.

* * * * *